(12) United States Patent
Razzaq et al.

(10) Patent No.: US 11,463,447 B2
(45) Date of Patent: *Oct. 4, 2022

(54) APPLICATION PLATFORM WITH FLEXIBLE PERMISSIONING

(71) Applicant: PAYPAL, INC., San Jose, CA (US)

(72) Inventors: Asim Razzaq, San Jose, CA (US);
Musaab At-Taras, San Jose, CA (US);
Damon Hougland, San Jose, CA (US);
Yuliya Gorbunova, San Jose, CA (US);
Saleem Shafi, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,229

(22) Filed: Oct. 6, 2020

(65) Prior Publication Data

US 2021/0051157 A1 Feb. 18, 2021

Related U.S. Application Data

(63) Continuation of application No. 16/399,486, filed on Apr. 30, 2019, now Pat. No. 10,798,107, which is a continuation of application No. 15/647,060, filed on Jul. 11, 2017, now Pat. No. 10,277,605, which is a continuation of application No. 15/162,284, filed on
(Continued)

(51) Int. Cl.
*H04L 9/40* (2022.01)
*G06F 21/33* (2013.01)

(52) U.S. Cl.
CPC .......... *H04L 63/105* (2013.01); *G06F 21/335* (2013.01); *H04L 63/08* (2013.01); *H04L 63/102* (2013.01); *G06F 2221/2141* (2013.01)

(58) Field of Classification Search
CPC ........ H04L 67/36; H04L 29/06; H04L 63/08; H04L 63/102; G06F 21/335
See application file for complete search history.

(56) References Cited

U.S. PATENT DOCUMENTS 6,088,659 A * 7/2000 Kelley .................. G06F 16/258
702/62
6,282,522 B1 * 8/2001 Davis ..................... G06Q 20/02
235/375

(Continued)

*Primary Examiner* — El Hadji M Sall
(74) *Attorney, Agent, or Firm* — Haynes and Boone, LLP

(57) ABSTRACT

Systems and methods are provided for an application platform with flexible permissioning. In one embodiment, an application platform with flexible permissioning comprises: a service provider server adapted to interact with an application development server and a client device over a network, the service provider server adapted to implement at least one application programming interface (API); one or more processors; and one or more memories adapted to store machine-readable instructions which when executed by the processors cause the application platform with flexible permissioning to: maintain a profile associated with at least one application developer using the application development server; receive an API call from the application developer; authenticate the application developer and authorize the API call; assign an access level to the application developer based on the profile associated with the application developer; and control permissions given to the application developer to perform operations available based on the assigned access level.

20 Claims, 4 Drawing Sheets

Related U.S. Application Data

May 23, 2016, now Pat. No. 9,705,891, which is a continuation of application No. 14/312,263, filed on Jun. 23, 2014, now Pat. No. 9,350,741, which is a continuation of application No. 12/848,533, filed on Aug. 2, 2010, now Pat. No. 8,775,618.

(56) References Cited

U.S. PATENT DOCUMENTS

| | | |
|---|---|---|
| 7,305,469 B2 | 12/2007 | Leahy et al. |
| 7,881,446 B1 | 2/2011 | Apple et al. |
| 8,108,518 B2 | 1/2012 | Leahy et al. |
| 8,171,458 B2 | 5/2012 | Cheng et al. |
| 8,732,709 B2 | 5/2014 | Smith, Jr. |
| 8,775,618 B2 | 7/2014 | Razzaq et al. |
| 9,350,741 B2 | 5/2016 | Razzaq et al. |
| 9,705,891 B2 | 7/2017 | Razzaq et al. |
| 2003/0088786 A1* | 5/2003 | Moran ................. H04L 63/105 726/4 |
| 2008/0209503 A1 | 8/2008 | Hess et al. |
| 2008/0263571 A1 | 10/2008 | Pousti et al. |
| 2010/0069035 A1 | 3/2010 | Johnson |
| 2012/0023545 A1 | 1/2012 | Qu |
| 2016/0011732 A1 | 1/2016 | Yano |

* cited by examiner

APPLICATION PLATFORM WITH FLEXIBLE PERMISSIONING

CROSS-REFERENCE TO RELATED APPLICATIONS

This continuation application claims priority to and the benefit of U.S. patent application Ser. No. 16/399,486, filed Apr. 30, 2019, which is a continuation of U.S. patent application Ser. No. 15/647,060 filed Jul. 11, 2017, issued as U.S. Pat. No. 10,277,605 on Apr. 30, 2019, which is a continuation of Ser. No. 15/162,284, filed May 23, 2016 and issued as U.S. Pat. No. 9,705,891 on Jul. 11, 2017, which is a continuation of U.S. patent application Ser. No. 14/312,263, filed on Jun. 23, 2014 and issued as U.S. Pat. No. 9,350,741 on May 24, 2016 and which is a continuation of U.S. patent application Ser. No. 12/848,533, filed on Aug. 2, 2010 and issued as U.S. Pat. No. 8,775,618 on Jul. 8, 2014. The contents of the above listed applications are incorporated herein by reference.

BACKGROUND

Technical Field

Embodiments of the present disclosure generally relate to application platforms, and more particularly, to methods and systems for providing flexible permissioning for application platforms.

Related Art

Existing application platforms allow an application developer to develop applications that may be used for various purposes in various contexts. In this regard, an application programming interface (API) is made available to application developers to develop applications for a specific application platform. The applications may be developed or sold by the manufacturer of a mobile device or by third party application developers. A consumer may load applications on the mobile device, which may run the applications after the mobile device has been manufactured and purchased.

An API is an interface that a software program implements to allow other software to interact with it. APIs may be implemented by applications, libraries and operating systems to define how other software can make calls to or request services from them. An API determines the vocabulary and calling conventions the application developer should employ to use the services. It may include specifications for routines, data structures, object classes, and protocols used to communicate between the application developer and the provider of the API.

Some companies make their APIs and related features freely available. For example, Microsoft makes the Microsoft Windows API public and Apple releases APIs such as Carbon and Cocoa so that software can be written for their platform. Other companies may protect information on their APIs from the general public. For example, Sony used to make its official PlayStation 2 API available only to licensed PlayStation developers. This enabled Sony to control who wrote PlayStation 2 games. Such control can have quality control benefits and potential license revenue.

However, making API features available to application developers may have a number of shortcomings related to security or confidentiality. For example, application developers may have different resources, preferences or policies for different types of security mechanisms, some preferring security mechanisms that are low in cost or easier to implement but not as reliable.

As such, providing application developers (licensed or not) with full access and use of all features of APIs may pose a risk that may be due at least in part, for example, to substandard security policies or practices of application developers using the APIs.

SUMMARY

As will be further described herein in relation to various embodiments, systems and methods are provided for an application platform with flexible permissioning so that full access and use of all features of APIs may be controlled to allow only those API features that a particular application developer may need based on the application developer's profile.

According to an embodiment, an application platform with flexible permissioning comprises a service provider server adapted to interact with an application development server and a client device over a network, wherein the service provider server is adapted to implement at least one application programming interface (API). The application platform with flexible permissioning also comprises one or more processors and one or more memories adapted to store a plurality of machine-readable instructions which when executed by the one or more processors are adapted to cause the application platform with flexible permissioning to: maintain, at the service provider server, a profile associated with at least one application developer using the application development server; receive an API call from the application developer; authenticate the application developer and authorize the API call; assign an access level to the application developer based on the profile associated with the application developer; and control permissions given to the application developer to perform operations available based on the assigned access level.

According to another embodiment, a computer-implemented method for providing an application platform with flexible permissioning comprises maintaining, at a service provider server, a profile associated with at least one application developer using an application programming interface (API) provided by the service provider server. The method also comprises receiving an API call from the application developer. The method also comprises authenticating the application developer and authorizing the API call. The method also comprises assigning an access level to the application developer based on the profile associated with the application developer; and controlling permissions given to the application developer to perform operations available based on the assigned access level.

According to another embodiment, an infrastructure for an application platform with flexible permissioning comprises a service provider server comprising an application platform that includes a plurality of application programming interfaces (APIs), wherein the APIs are adapted to be provided to at least one application developer using an application development server for developing applications operable on a client device. The infrastructure also comprises one or more processors; and one or more memories adapted to store a plurality of machine-readable instructions which when executed by the one or more processors are adapted to cause the infrastructure to: maintain, at the service provider server, a profile associated with the at least one application developer; receive an API call from the application developer; authenticate the application developer and authorize the API call; assign an access level to the application developer based on the profile associated with the application developer; and control permissions given to the application developer for operating functional capabilities of the APIs based on the assigned access level.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

As will be further described herein in relation to various embodiments, systems and methods are provided for an application platform with flexible permissioning so that full access and use of all features of application programming interfaces (APIs) may be controlled so that an application developer is allowed to access and/or use only those API features that the particular application developer may need based on the application developer's profile.

In this regard, features or functional capabilities of APIs may be catalogued into tiers or levels associated with a degree of risk for a particular application developer. An application developer is given permission to use or access only the features or functional capabilities in the tier or level to which the application developer has been granted permission. Furthermore, limits related to the functional capabilities may be configurable based on the degree of risk associated with the application developer's profile.

Figure 1:
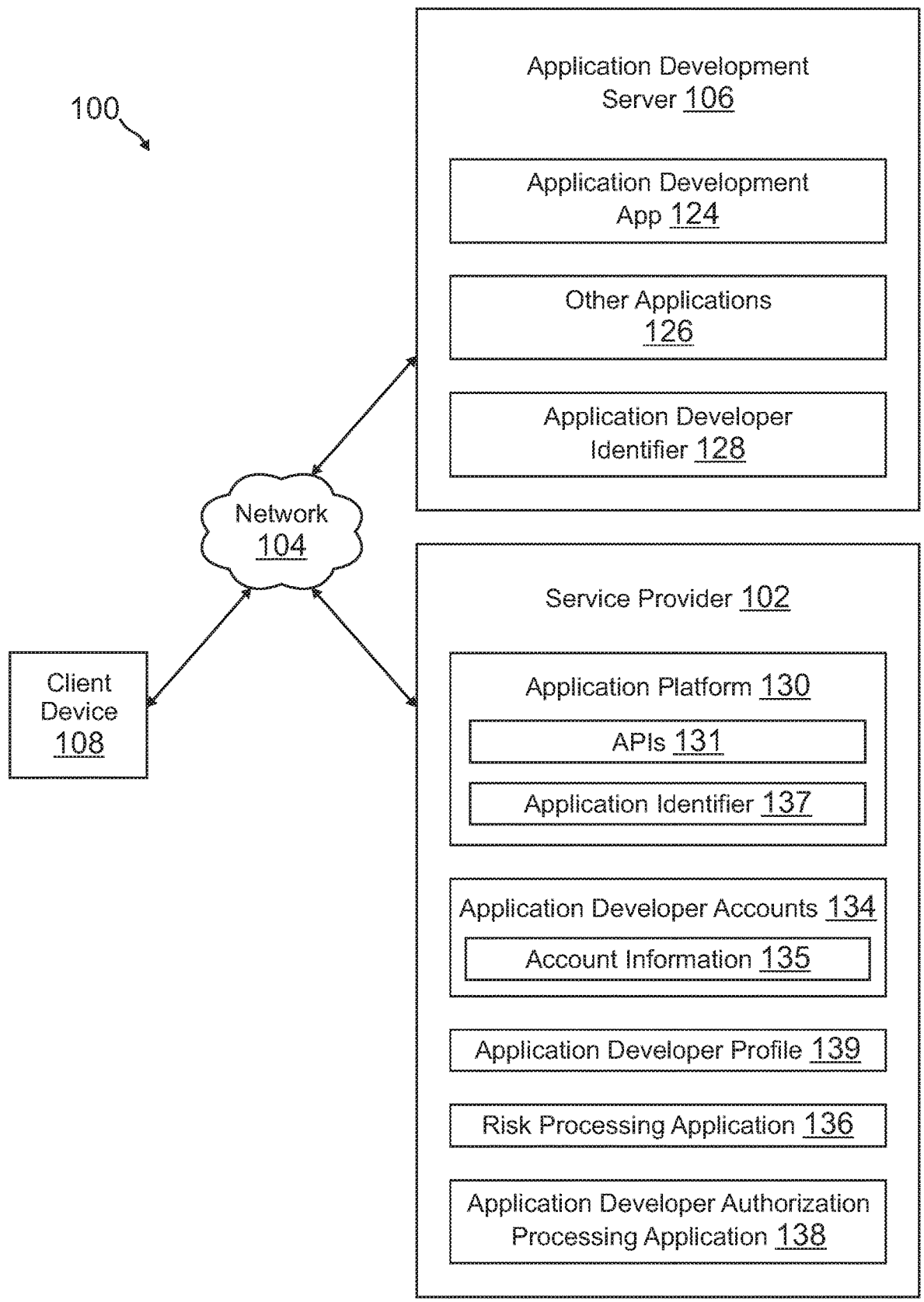
FIG. 1 illustrates a system for providing an application platform with flexible permissioning according to an embodiment of the present disclosure.

Referring now to the drawings wherein the showings are for purposes of illustrating embodiments of the present disclosure only, and not for purposes of limiting the same, FIG. 1 illustrates a system for providing an application platform with flexible permissioning according to an embodiment of the present disclosure.

A service provider 102 is adapted to interact, communicate or exchange data with an application development server 106 and a client device 108 via a network 104. Data connections between service provider 102 and application development server 106 and client device 108 may take place, for example, via SMS or a Wireless Application Protocol (WAP) over network 104. In addition, according to one or more embodiments, service provider 102 may have other data connections (not shown), for example, with subscriber Internet companies, Internet financial companies, Internet brokers or other Internet companies. In one embodiment, service provider 102 may be implemented by a payment service provider such as PayPal™, Inc., or eBay™, Inc. of San Jose, Calif.

Application development server 106 includes an application development application 124 that may be configured to process the creation and/or deployment of applications by application developers to be downloaded by one or more users of client device 108. The application developer may be an entity, for example an individual or a corporation, which develops one or more portions of an application, for example a software application, operable on different types of client devices. Examples of application developers include iTunes™, Sprint™, mFoundry™, Tivo™, Wii™, Playstation™, RIM™ application store, or the like. The application developer may be known or unknown to the manufacturer of client device 108.

Service provider 102 includes an application platform 130 that may be configured to interact with application developer server 106 so that an application developer is enabled to call APIs 131 in order to develop one or more applications. In this regard, service provider 102 may provide information to application development server 106 to assist the application developer in creating and/or deploying an application in a manner which is compatible with client device 108. Service provider 102 may assign application identifiers 137 for both internal and external identification.

Service provider 102 may maintain a plurality of application developer accounts 134, each of which may include account information 135 associated with specific application developers. For example, in one embodiment, account information 135 may include private or confidential information of an application developer such as account numbers, passwords, credit/debit card information, bank information, or other information that may be used to facilitate online or other types of transactions between service provider 102 and application developers using application development server 106.

The application developer may first register, prepare or otherwise sign up to use application platform 130 implemented by service provider 102. An application is externally developed software that may use APIs 131 of application platform 130. An application developer may also be referred to as an "App caller," which is an entity making an API call. Applications may be composed of one or more API calls and are run by App callers. An API call is an operation being called by the application developer, for example, to use a specific operation of service provider 102. In an embodiment where service provider 102 is a payment service provider such as PayPal, an operation may be called for the purpose of, for example, splitting payments between recipients. Application platform 130 may provide one or more specific capabilities referred to as a "functional capability." For example, in an embodiment where service provider 102 is implemented by a payment service provider, a functional capability may include a split payment. It should be noted that a functional capability may not be necessarily tied to a single API call.

Service provider 102 may further include a risk processing application 136 configurable to evaluate received information from application development server 106 over network 104 and store the information in a plurality of records that are associated with application developer accounts 134 so that a profile may be created for each application developer. It will be appreciated that by performing a plurality of transactions by an application developer with application development server 106, a plurality of records may be stored by service provider 102 and associated with an appropriate application developer account 134. Authorization information based on the plurality of records may be stored in an application developer authorization processing application 138.

The centralized storage of information or data of service provider 102 may be combined and enhanced with data obtained from business partners of service provider 102 including subscriber acquirers, brands, Internet companies, or other entities. In one embodiment where service provider 102 is PayPal™, Inc., the centralized stored information or data may be combined with data obtained from PayPal's business partners such as eBay™, thus resulting in even richer and more extensive data.

Client device 108 may be configured to download, install, and run applications created and/or deployed by application development server 106. Client device 108 may be implemented using any appropriate combination of hardware and/or software configured for wired and/or wireless communication over a network. For example, in one embodiment, client device 108 may be implemented as a mobile device in communication with network 104 such as the Internet or another network. In other embodiments, client device 108 may be implemented as a personal computer, wireless telephone, personal digital assistant (PDA), key fob, smart phone, smart card, notebook computer, game console, digital video recorder (DVR), and/or other types of computing devices. Furthermore, client device 108 may be enabled for NFC, Bluetooth, online, infrared communications and/or other types of communications.

Application development server 106 may include various other applications 126 as may be desired in particular embodiments to provide desired features to application developers using application development server 106. For example, in various embodiments, other applications 126 may include security applications for implementing security features or any other types of applications.

Application development server 106 may provide information to service provider 102 to open an application developer account 134. In this regard, it will be appreciated that the application developer may provide account information to service provider 102 over network 104 through, for example, a secure connection between application development server 106 and service provider 102. For example, service provider 102 may provide a webpage that may be viewed by an application developer through a browser application.

The information provided to service provider 102 may be used to assign a specific application developer identifier 128, which application development server 106 may store, and may be used to identify the particular application developer as having an application developer account 134 maintained by service provider 102. Application developer identifiers may be implemented, for example, as one or more cookies, operating system registry entries, hardware identifiers, or other types of identifiers. Other data specific to the application developer may be created and stored by service provider 102, including for example, signature information and an application developer profile 139. Signature information is a way to identify the application developer. Furthermore, application developer profile 139 may be created, for example, based on an application developer's typical behavior in transactions.

Client device 108, application developer server 106, and service provider 102 may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over a network, which may be implemented as a single network or a combination of multiple networks. For example, in various embodiments, network 104 may include the Internet or one or more intranets, landline networks, wireless networks, and/or other appropriate types of networks.

Figure 2:
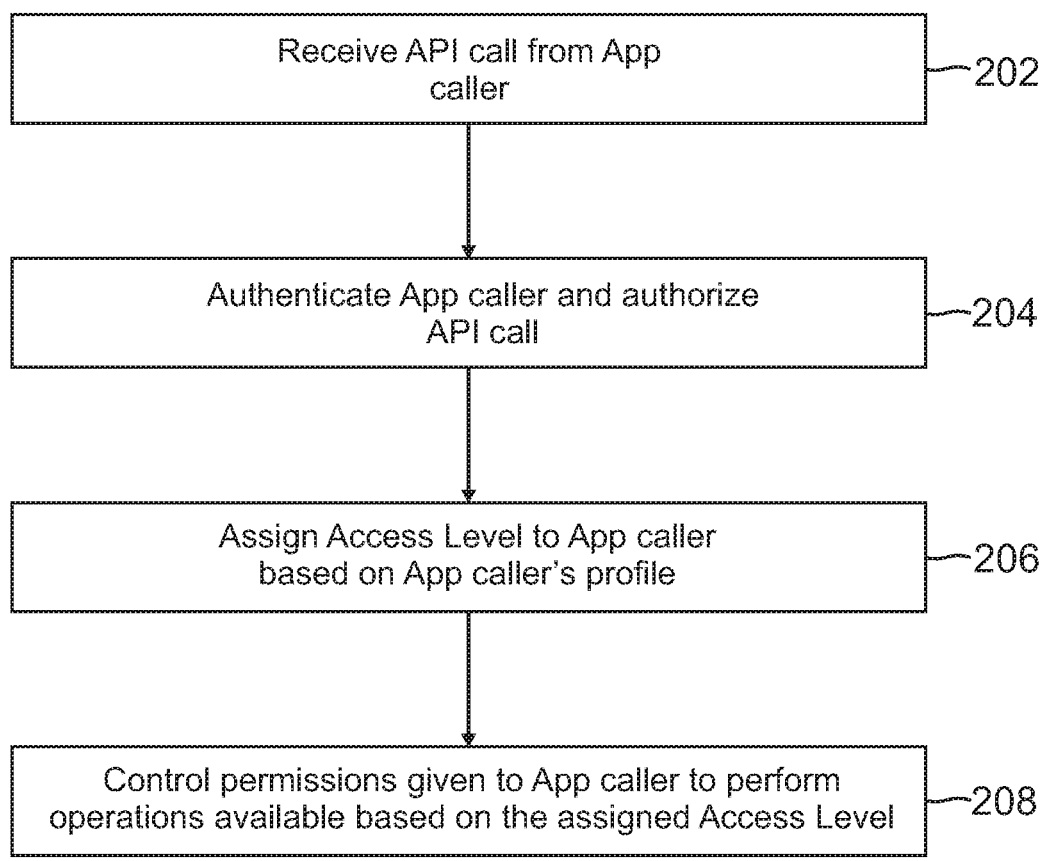
FIG. 2 is a flow diagram illustrating a method for providing an application platform with flexible permissioning according to an embodiment of the present disclosure.

FIG. 2 is a flow diagram illustrating a method for providing an application platform with flexible permissioning according to an embodiment of the present disclosure. The method of FIG. 2 may be implemented by the system of FIG. 1 according to an embodiment.

In block 202, service provider 102 may receive an API call from an application developer or App caller using application development server 106. The App caller may wish to create an application and access features of an API 131 of application platform 130. App callers may also be known as Actors with existing authorization and authorization credentials such as username, password or passcode, and a 3-token signature or certificate.

In block 204, service provider 102 authenticates the App caller and authorizes the API call. For example, service provider 102 may first verify the App caller's credentials such as username, password or passcode so that the credentials match information maintained by service provider 102. For example, information in connection with application developer identifier 128 of application development server 106 is verified. Other data maintained at service provider 102 such as signature information and application developer profile information maintained for example in application developer profile 139, may also be used to correlate and authenticate the application developer. If particular information provided by the App caller appears to be out of line with the App caller's typical profile as maintained in application developer profile 139, the App caller may not be authenticated. For instance, if the application developer generally only deals with transactions over the telephone for a particular technology, a transaction related to a different odd technology may raise a fraud alert. Other data that may raise fraud alerts include the number of transactions, the time of day or the time of year when the transaction takes place. Finally, transactions made over application development server 106 may also provide geo-location information using for example a Global Positioning Satellite (GPS) to identify the location of the application development server 106 (and correspondingly the application developer). The location of application developers as well as other credentials may be helpful in establishing risk models for transactions.

In addition, an API may be checked to ensure that the API is valid and active. If the App caller is allowed to use the particular API, then the API call may be authorized. If the App caller is not allowed to use the particular API, then the API call is rejected.

In block 206, once an App caller is authenticated and the API call is authorized, an "Access Level" is assigned to the App caller based on the App caller's profile. When an entity applies to be an application developer or App caller (caller of APIs of application platform 130), the entity may be vetted using a risk analysis or technique used by Risk Processing Application 136 of service provider 102. The App caller may be vetted, for example, on its financial and identity trustworthiness. Based on such vetting, application developer account 134 for the particular App caller may be assigned an Access Level with respect to APIs 131 in application platform 130.

In block 208, controlled permissions are given to the App caller to perform operations available based on its assigned Access Level. That is, all functional capabilities in the assigned Access Level may be allowed when the App caller makes a call. APIs 131 may be called only within the context of an application. Each application may be identified by application identifier 137.

Application platform 130 of service provider 102 exposes services to external application developers or App callers using application development server 106 to create applications. As such, risk analysis may be used to classify an App caller into a tier. A tier (also known as a "level") is a level of risk associated with a given App caller, and may also be used to provide an initial set of functional capabilities to a particular App caller. Tiers may be created for the services built into application platform 130. Functional capabilities may also be placed into several tiers based on a risk factor of a functional capability.

In an embodiment where service provider 102 is a payment service provider such as PayPal, API calls may be placed in connection with, for example, different adaptive payments such as splitting payments to different receivers in series or parallel, creating accounts, or the like. Examples of functional capabilities are shown in Table 1 below, and include:

TABLE 1

Examples of functional capabilities

| Associated API Call | Functional Capability |
| --- | --- |
| AdaptivePayment.Pay | Make Parallel Payment |
| AdaptiveAccount.CreateAccount | Create Personal Account |
| AdaptiveDispute.CreateDispute | Can Create US Account |

As discussed above, functional capabilities may be placed into several tiers based on a risk factor of a functional capability. Table 2 below illustrates an example of a tier in an embodiment where service provider 102 is a payment service provider such as PayPal. Examples of a tier (or a level) may include a "Standard" tier and an "Advanced" tier. As shown in Table 2, for example, an API call for Adaptive Payments.Pay in connection with a functional capability "Simple Send Money" is placed in a Standard tier. An API call for Adaptive Payments.Pay in connection with a functional capability to "Make Preapproved Payment" is placed in an Advanced tier. Examples of a tier (or a level) include:

TABLE 2

Examples of a Tier (or a Level)

| Tier | Associated API Call | Functional Capability |
| --- | --- | --- |
| Standard | AdaptivePayments.Pay | Simple Send Money |
|  | AdaptiveTransaction.GetTransactionDetails | Get Transaction Details |
| Advanced | AdaptivePayment.Pay | Make Preapproved Payment |
|  | AdaptiveAccounts.CreateAccount | Create Account |

That is, functional capabilities may be based on tiers, standard or advanced. It should be understood that functional capabilities are not necessarily tied to one specific API call.

Permissions in either the standard tier or the advanced tier may be given to an application developer or App Caller based on the profile or vetting of the application developer. The application developer with a qualifying profile or vetting may be classified in the advanced tier and have access to corresponding functional capabilities therein. Such granular process allows for general access as a whole within a tier or may be broken into smaller usable segments. For example, a billing agreement may be given only to certain levels of access depending on the tier thus allowing for a level of flexibility based on risk factors that limit access to certain provisions. Only vetted application developers may use or access certain or all features of an API as needed, whereas application developers that are not qualified may only have limited or no use or access to such features.

By way of example and not of limitation, an analogy may be made with respect to fine tuning or turning of a knob wherein access to certain API features or functions is granted upon tweaking of the knob to increase or decrease limits, feedback and/or access as will be described herein.

Figure 3:
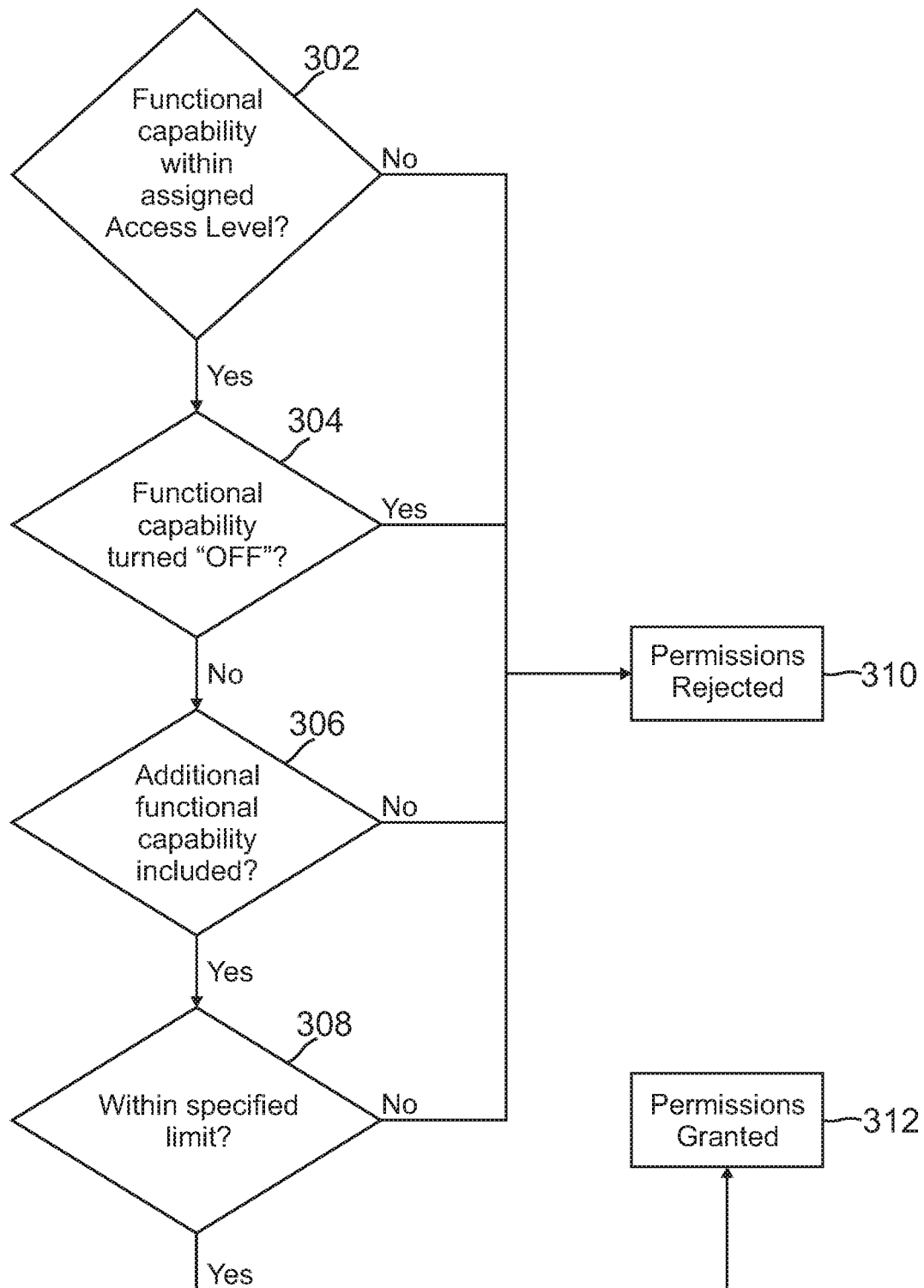
FIG. 3 is a flow diagram for controlling permissions to use functional capabilities of APIs according to an embodiment of the present disclosure.

FIG. 3 is a flow diagram for controlling permissions to use functional capabilities of APIs according to an embodiment of the present disclosure. Use of functional capabilities of APIs may be controlled with respect to an App Caller in various manners. For example, App callers may exercise functional capabilities in connection with an API call as follows: a) in block 302, only within the assigned "Access Level" as discussed above; b) in block 304, only within the assigned "Access Level," except for functional capabilities that are explicitly turned off; c) in block 306, only within the assigned "Access Level" including additional functional capabilities such as additional Business Unit (BU)-level functional capabilities; and d) in block 308, only within specified limits. A BU-level functional capability may be determined by service provider 102 in accordance with, for example, specific business goals.

In block 302, with respect to App callers exercising functional capabilities as discussed above, all App callers may be vetted and assigned a corresponding Access Level in connection with an application developer or App caller account 134. All functional capabilities in the assigned Access Level are allowed when an App caller makes a call. However, if an App caller tries to exercise a functional capability that is in a level higher than what the App caller is vetted for, then the call is rejected in block 310, for example, with an error code or message.

The relationship between an App caller's account 134 and its Access Level may be stored in a domain for Risk Processing Application 136 of service provider 102. The relationship between functional capabilities and Access Levels may also be stored in a domain in Risk Processing Application 136. Application Developer Authorization Processing Application (also referred to as "Userauthserv") 138 may use the list of functional capabilities available to an application developer or App caller account based on the Access Level for granting or rejecting permissions.

In block 304, after an App caller is vetted and correspondingly assigned to an Access Level, additional controls, limits or restrictions may be imposed on the App caller's account 134, for example, by turning off certain functional capabilities for the particular App caller. If the App caller tries to exercise a functional capability that has been turned off, the call is rejected in block 310, for example, with an error code or message.

The relationship between an App caller account and the list of functional capabilities that are turned off, may be stored, for example, in an application developer domain in Userauthserv 138, which reconciles the list of functional capabilities provided at Risk Processing Application 136 with the functional capabilities that are turned off.

In block 306, in addition to risk-controlled functional capabilities, there may be an additional category of functional capabilities that may be managed or controlled. For example, additional Business Unit (BU)-level functional capabilities may be managed. This allows a Business Unit to enable additional functionality for an App Caller's account without having to go through risk vetting.

Default settings for each control may be applied to each application developer account, that is, no special policy or rule is necessary that determines whether or not a particular functional capability is allowed. That is, a BU, for example, may turn on additional functional capabilities for a particular application developer account. If an App Caller tries to exercise a functional capability that is not turned on for the particular App Caller's account, the call may be rejected in block 310, for example, with an error code or error message.

The relationship between an App Caller account and selected functional capabilities, for example, BU-level functional capabilities may be stored, for example, in an application developer domain in Userauthserv 138, which adds BU-level controls with respective answers (e.g., granted or rejected) to the list of functional capabilities.

In block 308, one or more functional capabilities may have specified limits associated with them. If an App caller tries to exercise a functional capability that is not within the specified limits for the particular App caller's account, the call may be rejected in block 310, for example, with an error code or error message. Specified limits and examples will be described in more detail below.

In block 312, permissions are granted to App Callers exercising functional capabilities of APIs when the functional capability is within an assigned Access Level, the functional capability is not turned "OFF", the functional capability is included as an additional functional capability, and a specified limit for the functional capability is met.

With respect to specified limits, limits normally may represent some numeric values that refine the functional capability or control. For example, an application developer account 134 may be allowed to exercise chained-payments, but only up to 4 legs (or transactions). Limits may be configurable for each application developer account such that two different accounts with the same functional capability turned on may exercise that functional capability up to the different limits, respectively.

In some embodiments, there may be two types of limits: numeric rates and geographic. Generally, numeric and geographic limits may be enabled for any functional capability or control. Table 3 below illustrates an example of numeric-preapproval limits:

TABLE 3

| Numeric - Preapproval Limits | | | | |
|---|---|---|---|---|
| Functional Capabilities AP | | | | |
| Preapproval | $xxx/unlimited | unlimited/N | unlimited/N | N years |
| Preapproval with PIN | $xxx/unlimited | unlimited/N | unlimited/N | N years |
| Preapproval Subscrption | $xxx/unlimited | unlimited/N | unlimited/N | N years |

In the example of Table 3 above, pre-approval limits may be settable for the maximum amount of money, the maximum amount of agreements, the maximum amount of transactions per agreement, and/or the maximum duration of an agreement allowed based in general or in connection with an identifier such as a PIN or passcode or a subscription. In one embodiment, an App Caller may be limited or restricted to a smaller set of operations or features of an API, or may be required to pay a higher amount of money for increased use of operations or features.

Limits may also be imposed based on rates. Table 4 below illustrates an example of numeric-rate limits:

TABLE 4

| Numeric - Rate Limits | | | |
|---|---|---|---|
| Functional Capabilities AA | | | |
| Create Consumer Account Web | 100 | N | N |
| Create Consumer Account Mobile | 100 | N | N |
| Create Business Acct Web | 100 | N | N |
| Create Business Acct Mobile | 100 | N | N |

In the example of Table 4 above, rate limiting may be conducted for the number of calls per day, the number of calls per months, and/or the number of calls per week allowed based on different types of accounts such as consumer or business accounts over a network such as the Internet or web, or over a mobile device.

Functional capabilities may further be limited based on geographic limits. Table 5 below illustrates an example of geographic limits:

TABLE 5

Geographic Limits

| Functional Capabilities | | | | | |
|---|---|---|---|---|---|
| Create Consumer Account Web | ON/OFF | ON/OFF | ON/OFF | ON/OFF | ON/OFF |
| Create Consumer Account Mobile | ON/OFF | ON/OFF | ON/OFF | ON/OFF | ON/OFF |
| Create Business Acct Web | ON/OFF | ON/OFF | ON/OFF | ON/OFF | ON/OFF |
| Create Business Acct Mobile | ON/OFF | ON/OFF | ON/OFF | ON/OFF | ON/OFF |

In the example of Table 5 above, geographic limits or controls may be imposed where allowed based on different types of accounts such as consumer or business accounts over a network such as the Internet or web, or over a mobile device. By default, functional capabilities may be allowed everywhere. However, an ON/OFF switch may be used to restrict the functional capability to a certain geographical location(s). In an embodiment where service provider 102 is a payment service provider such as PayPal, for example, a functional capability may be configurable to certain geographical locations such as API Caller Home, EU (Europe), PP Inc (corporate headquarters), AU (Australia) and/or CA (Canada).

Embodiments of the present disclosure provide a solution for evaluating policies or rules associated with an App Caller for determining whether or not a particular functional capability in an application platform is allowed in connection with the particular App Caller. In general, API calls made to application platform 130 of service provider 102 may operate functional capabilities for which they are authorized. Authorization information may be provided for a particular App Caller making an API call. The authorization information may include: 1) a complete list of functional capabilities with a decision to grant or reject; and 2) a list of limits associated with the functional capabilities.

The authorization information may be used for enforcement purposes. If all functional capabilities are shown as not granted (or rejected), the API call is rejected with, for example, an error code or message. If an App Caller tries to exercise a functional capability that is not authorized, the API call is rejected with, for example, an error code or message. If an App caller tries to execute a functional capability violating the limits, the API call is rejected with, for example, an error code or message. It should be noted that error codes or messages may or may not be the same for each instance of rejecting an API call.

Each API call may be annotated with one or more functional capabilities. A call may then be made into the Userauthserv 138 with the list of functional capabilities. The results of the evaluation are then reported back. The result of the evaluation includes the list of functional capabilities, the policy decision on each functional capability (yes/no) and the reason for refusal (if any). Furthermore, if applicable, a list of limits associated with the functional capabilities in question will be returned.

To facilitate the evaluation process, each operation may be annotated with all the functional capabilities. Logic for annotation processing may be created. On each incoming call, the annotations may be processed and Userauthserv 138 may be called to provide the list of functional capabilities to evaluate. The evaluation results may be stored in a security context of the call. Ways for reading the security context may be provided so that the results of the evaluation may be read and enforced.

Every functional capability may have a policy associated therewith. A policy is a rule or logical expression that evaluates account properties and arrives to, for example, a Boolean result. Table 6 below is an example of account properties that may be evaluated for each functional capability. Table 6 may be an example associated with an embodiment where service provider 102 is a payment service provider such as PayPal:

TABLE 6

Policies for Functional Capabilities

| | | |
|---|---|---|
| Standard | SIMPLE_SEND_MONEY<br>PARALLEL_PAYMENTS<br>GET_PAYMENT_DETAILS<br>INITIATE_REFUNDS<br>CONVERT_CURRENCY<br>CREATE_CONSUMER_ACCOUNT_WEB<br>GET_VERIFIED_STATUS | Does App Caller have a Business Verified Account? |
| | CREATE_BUSINESS_ACCOUNT_WEB | Does App Caller have Business Verified account?<br>Does App Caller belong to Entry Access Level?<br>Is not restricted to use a FC?<br>Does App Caller have Business Verified account?<br>Does App Caller belong to Advance Access Level?<br>Is not restricted to use a FC? |
| | PREAPPROVALS_WITH_PIN<br>GET_BILLING_ADDRESS | Does App Caller have Business Verified account?<br>Does App Caller belong to Advanced Plus Access Level?<br>Is not restricted to use a FC? |
| | ADD_BANK_ACCOUNT_DIRECT | Does App Caller have Business Verified account? |

TABLE 6-continued

Policies for Functional Capabilities

| | |
|---|---|
| BU-Controlled | Does App Caller belong to Strategic Partner Access Level?<br>Is not restricted to use a FC?<br>Does App Caller have a Business Verified Account?<br>Is App Caller allowed to use a BU-controlled Functional Capability? |

In the example of Table 6 above, six "Access Levels" may be provided for specific functional capabilities depending on the applicable policies. For a "Standard" Access Level, an API caller would have access to the functional capabilities listed therein if the App Caller has a business verified account.

For an "Entry" Access Level, an API caller would have access to the functional capabilities listed therein if the App Caller has a business verified account, belongs to "Entry" Access Level, and is not restricted to use a functional capability.

For an "Advanced" Access Level, an API caller would have access to the functional capabilities listed therein if the App Caller has a business verified account, belongs to "Advanced" Access Level, and is not restricted to use a functional capability.

For an "Advanced Plus" Access Level, an API caller would have access to the functional capabilities listed therein if the App Caller has a business verified account, belongs to "Advanced Plus" Access Level, and is not restricted to use a functional capability.

For a "Strategic Partner" Access Level, an API caller would have access to the functional capabilities listed therein if the App Caller has a business verified account, belongs to "Strategic Partner" Access Level, and is not restricted to use a functional capability.

Finally, for a "BU-Controlled" Access Level, an API caller would have access to the functional capabilities listed therein if the App Caller has a business verified account and is allowed to use a BU-controlled functional capability.

According to one or more embodiments, service provider 102 may have certain administrative capabilities with respect to Access Levels for APIs. Administrative capabilities may include, for example: i) switching Access Levels for App callers; ii) restricting App caller's access to a functional capability within an assigned tier; iii) allowing App callers to access non-risk functional capabilities; and iv) setting limits for an App caller.

With respect to i) switching Access Levels for App callers, when an Access Level is changed for an App caller, the list of functional capabilities is dynamically updated to reflect the functional capabilities allowed for that Access Level. For example, the setting may be turned to "ON" for each functional capability that is provisioned at the particular Access Level. Only functional capabilities available for the particular Access Level may be shown in addition to default limits.

With respect to ii) restricting App caller's access to a functional capability within an assigned tier, when a functional capability needs to be turned OFF, an interface such as a button or a toggle may be provided. When a functional capability is "OFF", the defaults may be shown in faded mode or not shown at all. Table 7 below is an example showing toggle interfaces that may be used to change payment permissions with respect to functional capabilities and related limits. For example, permission may be given for a "Chained Payment" functional capability, or, if desired, the permission may be rejected by using the toggle interface to switch to "No." Correspondingly, for example, a limit on the number of transactions per split may also be set. In this example, the limit is set to 3 transactions per split:

TABLE 7

Example of Payment Permissions

| | | |
|---|---|---|
| Chained Payment: | Yes | [Toggle] |
| Number of transactions per split: | 3 | |
| Parallel Payment: | Yes | [Toggle] |
| Number of transactions per split: | 3 | |
| Implicit Payment: | Yes | [Toggle] |
| Simple Payment: | Yes | [Toggle] |
| Get Payment Details: | Yes | [Toggle] |
| Refund: | Yes | [Toggle] |
| Convert Currency: | Yes | [Toggle] |
| Get Billing Address: | Yes | [Toggle] |

With respect to iii) allowing App callers to access non-risk functional capabilities, in general, functional capabilities that are not associated with any Access Level may be turned "OFF" by default. In some cases, an interface such as a button or a toggle may be provided to turn "ON" a non-risk functional capability.

With respect to iv) setting limits for an App Caller, editable fields for limits such as numeric limits may be provided, for example, as illustrated in Tables 3 and 4 above. In an embodiment where geographical limitations are to be set, the ability to restrict a functional capability to a location may be provided.

Figure 4:
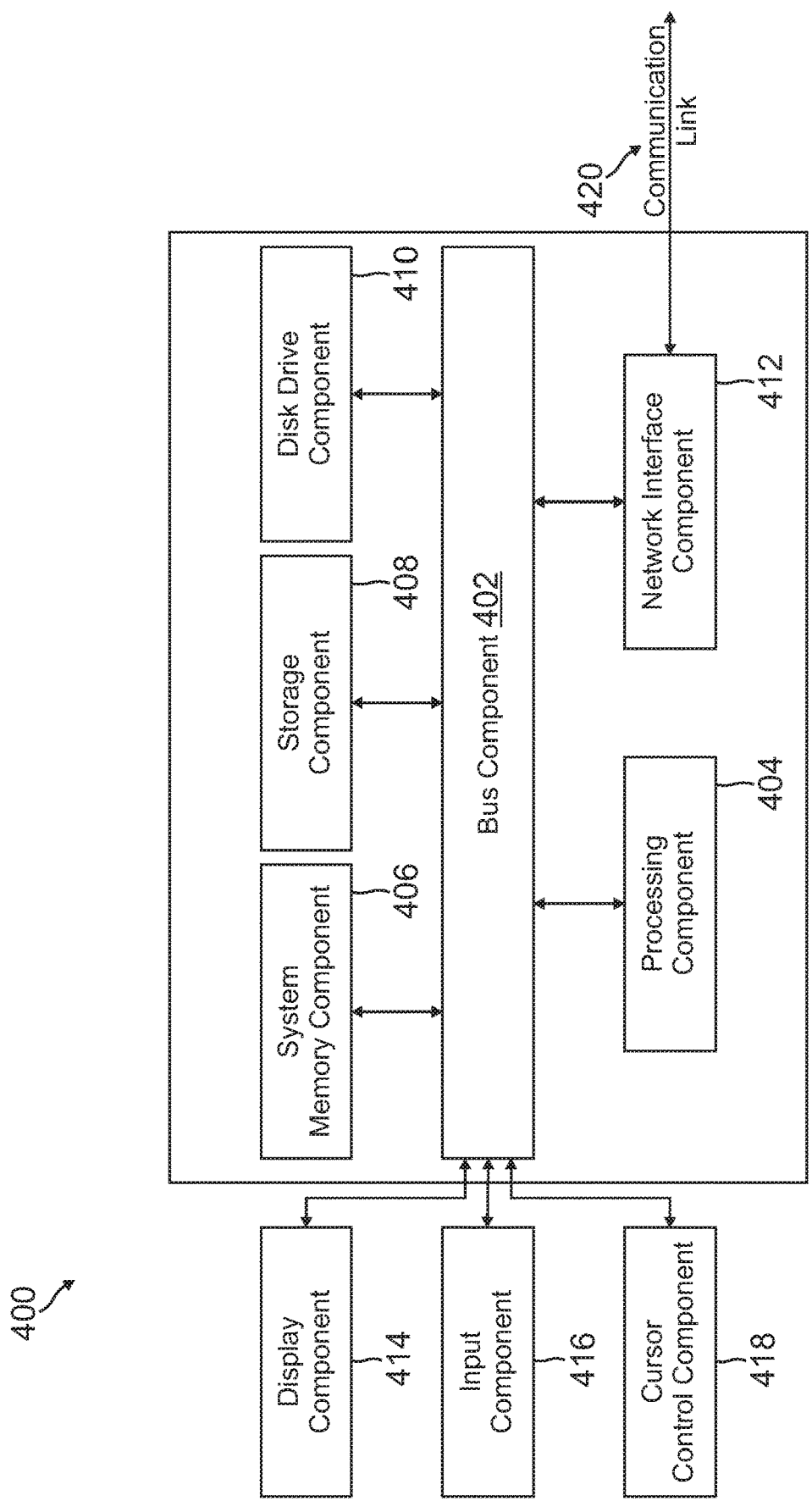
FIG. 4 is a block diagram illustrating a system for implementing a device according to one embodiment of the present disclosure.

Referring now to FIG. 4, a block diagram of a system for implementing a device is illustrated according to one embodiment of the present disclosure.

FIG. 4 is a block diagram of a system 400 suitable for implementing embodiments of the present disclosure, including client device 108, application development server or device 106, and service provider 102 server or device. System 400, such as part of a mobile phone, personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406.

Such instructions may be read into system memory component 406 from another computer readable medium, such as static storage component 408. These may include instructions to create accounts, process applications, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for application processing, payments, financial transactions or other transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 104 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

As described herein according to one or more embodiments, instead of providing full access to all API features to API callers that may not have a need for such full access, flexible permissions are fine tuned or controlled in a granular way so that the API caller may use or access only API features or functional capabilities they need according to the API caller's profile.

Although various components and steps have been described herein as being associated with client device 108, application development server 106, and service provider 102 of FIG. 1, it is contemplated that the various aspects of such servers illustrated in FIG. 1 may be distributed among a plurality of servers, devices, and/or other entities. For example, in one embodiment, risk processing application 136 may be implemented by an entity separate from service provider 102. Accordingly, in such an embodiment, communications described herein performed in relation to risk processing application 136 may be provided to a separate entity and need not be routed through service provider 102 in all instances.

Where applicable, various embodiments provided by the present disclosure may be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A server system, comprising:
a processor; and
a non-transitory computer-readable medium have stored thereon instructions that are executable to cause the system to perform operations comprising:
receiving a first application programming interface (API) call associated with an API that is configured to provide access to a plurality of functions of the API, wherein the first API call specifies a plurality of parameters for an electronic currency transaction corresponding to the first API call;
determining an API sender identity corresponding to a sender of the first API call;
based on the API sender identity, accessing an API user profile that defines a first access level of a plurality of different access levels that are provided via the API, wherein the plurality of different access levels are configured to control access to different ones of the plurality of functions of the API; and
based on the first access level and information specified in the API call, determining whether to complete the electronic currency transaction corresponding to the first API call by providing access defined by the first access level.

2. The server system of claim 1, wherein the determining the API sender identity is based on information included in the first API call.

3. The server system of claim 1, wherein the determining whether to complete the electronic currency transaction corresponding to the first API call is further based on a comparison of a first group of parameters from the plurality of parameters to one or more corresponding groups of one or more parameters associated with one or more previously made API calls by the sender of the first API call.

4. The server system of claim 3, wherein the first group of parameters includes an electronic currency transaction type.

5. The server system of claim 1, wherein the determining whether to complete the electronic currency transaction corresponding to the first API call is based on geographic location information associated with the sender of the first API call.

6. The server system of claim 5, wherein the geographic location information comprises Global Positioning Satellite (GPS) location information for the sender of the first API call.

7. The server system of claim 1, wherein the determining the API sender identity is based on an authorization credential corresponding to the first API call.

8. The server system of claim 7, wherein the authorization credential comprises at least one of a username or a password.

9. A method, comprising:
receiving, at a server computer system from a sender computer system, a first application programming interface (API) call associated with an API that is configured to provide access to a plurality of functions of the API, wherein the first API call specifies a plurality of parameters for an electronic currency transaction corresponding to the first API call;
determining, by the server computer system, an API sender identity corresponding to a sender of the first API call;
based on the API sender identity, accessing an API user profile that defines a first access level of a plurality of different access levels that are provided via the API, wherein the plurality of different access levels are configured to control access to different ones of the plurality of functions of the API; and
based on the first access level and information specified in the API call, determining whether to allow completion of the first API call via access defined by the first access level.

10. The method of claim 9, wherein the determining the API sender identity is based on at least one of a cookie associated with the sender computer system, an operating system registry entry associated with the sender computer system, a hardware identifier associated with the sender computer system, or signature information associated with the sender computer system.

11. The method of claim 9, further comprising:
the computer system processing the electronic currency transaction in response to a determination that the first API call is authorized to be completed; and
transmitting, to the sender computer system, information indicating that the electronic currency transaction has been completed.

12. The method of claim 9, wherein the determining whether to allow completion of the first API call is based on an analysis of previous API calls associated with the API user profile.

13. The method of claim 12, wherein the analysis includes a comparison of one or more particular parameters used for one or more of the previous API calls to one or more parameters specified by the first API call, wherein the one or more particular parameters include information relating to electronic currency transactions.

14. The method of claim 9, further comprising:
servicing the first API call; and
transmitting a response to the first API call to the sender computer system.

15. The method of claim 9, wherein the determining the API sender identity is based on an authorization credential corresponding to the first API call.

16. The method of claim 9, further comprising:
the computer system declining to process the electronic currency transaction in response to a determination that the first API call is not authorized to be completed; and
transmitting, to the sender computer system, information indicating that the electronic currency transaction has not been completed.

17. A non-transitory computer-readable medium having stored thereon instructions that are executable by a computer system to cause the computer system to perform operations comprising:
receiving a first application programming interface (API) call associated with an API that is configured to provide access to a plurality of functions of the API, wherein the first API call specifies a plurality of parameters for an electronic currency transaction corresponding to the first API call;
determining an API sender identity corresponding to a sender of the first API call;
based on the API sender identity, accessing an API user profile that defines a first access level of a plurality of different access levels that are provided via the API, wherein the plurality of different access levels are configured to control access to different ones of the plurality of functions of the API;
based on the first access level and information specified in the API call, making a determination on whether to complete the electronic currency transaction corresponding to the first API call by providing access defined by the first access level; and
providing a response to the sender of the first API call indicating whether the electronic currency transaction was completed.

18. The non-transitory computer-readable medium of claim 17, wherein the determining the API sender identity is based on information included in the first API call.

19. The non-transitory computer-readable medium of claim 17, wherein the determining whether to complete the electronic currency transaction corresponding to the first API call is further based on a comparison of a first group of one or more of parameters from the plurality of parameters to one or more corresponding groups of one or more parameters associated with one or more previously made API calls by the sender of the first API call.

20. The non-transitory computer-readable medium of claim 17, wherein the determining the API sender identity is based on an authorization credential corresponding to the first API call.

* * * * *